United States Patent [19]

Belter

[11] Patent Number: 5,645,282
[45] Date of Patent: Jul. 8, 1997

[54] MULTI-PURPOSE GROMMET

[75] Inventor: Jerome G. Belter, Mt. Prospect, Ill.

[73] Assignee: Dana Corporation, Toledo, Ohio

[21] Appl. No.: 404,001

[22] Filed: Mar. 14, 1995

[51] Int. Cl.$^6$ .............................. F16J 15/10; F16B 37/04
[52] U.S. Cl. ................. 277/11; 277/235 B; 277/166; 411/182; 411/510; 411/437
[58] Field of Search .................. 277/11, 235 B, 277/166, 181, 189; 411/182, 510, 509, 437

[56] References Cited

U.S. PATENT DOCUMENTS

| | | | |
|---|---|---|---|
| Re. 24,065 | 10/1955 | Bergstrom | 277/11 |
| 3,449,799 | 6/1969 | Bien | 411/510 |
| 3,756,116 | 9/1973 | Schuplin | 411/182 |
| 4,014,245 | 3/1977 | Frye et al. | 411/182 |
| 4,524,979 | 6/1985 | Bauder | 277/189 |
| 4,602,125 | 7/1986 | West et al. | 277/189 |
| 4,730,836 | 3/1988 | Miller et al. | 277/235 B |
| 4,770,582 | 9/1988 | Junemann et al. | 411/182 |
| 4,784,396 | 11/1988 | Scott et al. | 277/235 B |
| 4,819,954 | 4/1989 | Fucci et al. | 277/235 B |
| 4,971,500 | 11/1990 | Benoit et al. | 411/182 |
| 5,044,641 | 9/1991 | Belter | 277/11 |
| 5,104,272 | 4/1992 | Dupont et al. | 411/510 |
| 5,324,147 | 6/1994 | Leon | 411/182 |
| 5,387,065 | 2/1995 | Sullivan | 411/510 |

FOREIGN PATENT DOCUMENTS

| | | | |
|---|---|---|---|
| 969734 | 7/1958 | Germany | 411/437 |
| 942114 | 11/1963 | United Kingdom | 277/11 |

Primary Examiner—William A. Cuchlinski, Jr.
Assistant Examiner—John L. Beres
Attorney, Agent, or Firm—Rader, Fishman, Grauer PLLC

[57] ABSTRACT

A flexible plastic grommet is received in an aperture of an internal combustion engine with the multiple purposes of frictionally engaging the gasket to prevent separation, locating the gasket with respect to separate but communicating components, and retaining a threaded fastener in the grommet which is used to join the mechanical components. The grommet comprises a sidewall with a plurality of symmetrically spaced circumferentially disposed grooves that extend longitudinally along the grommet. An innermost periphery of the sidewall is defined by a base of each of the grooves while an outermost periphery of the sidewall extends circumferentially between each of the grooves. The innermost periphery and the outermost periphery of the sidewall comprise a plurality of locking projections extending radially away from the sidewall to promote frictional engagement between the grommet and the gasket, fastener, and the one of the mechanical components.

18 Claims, 2 Drawing Sheets

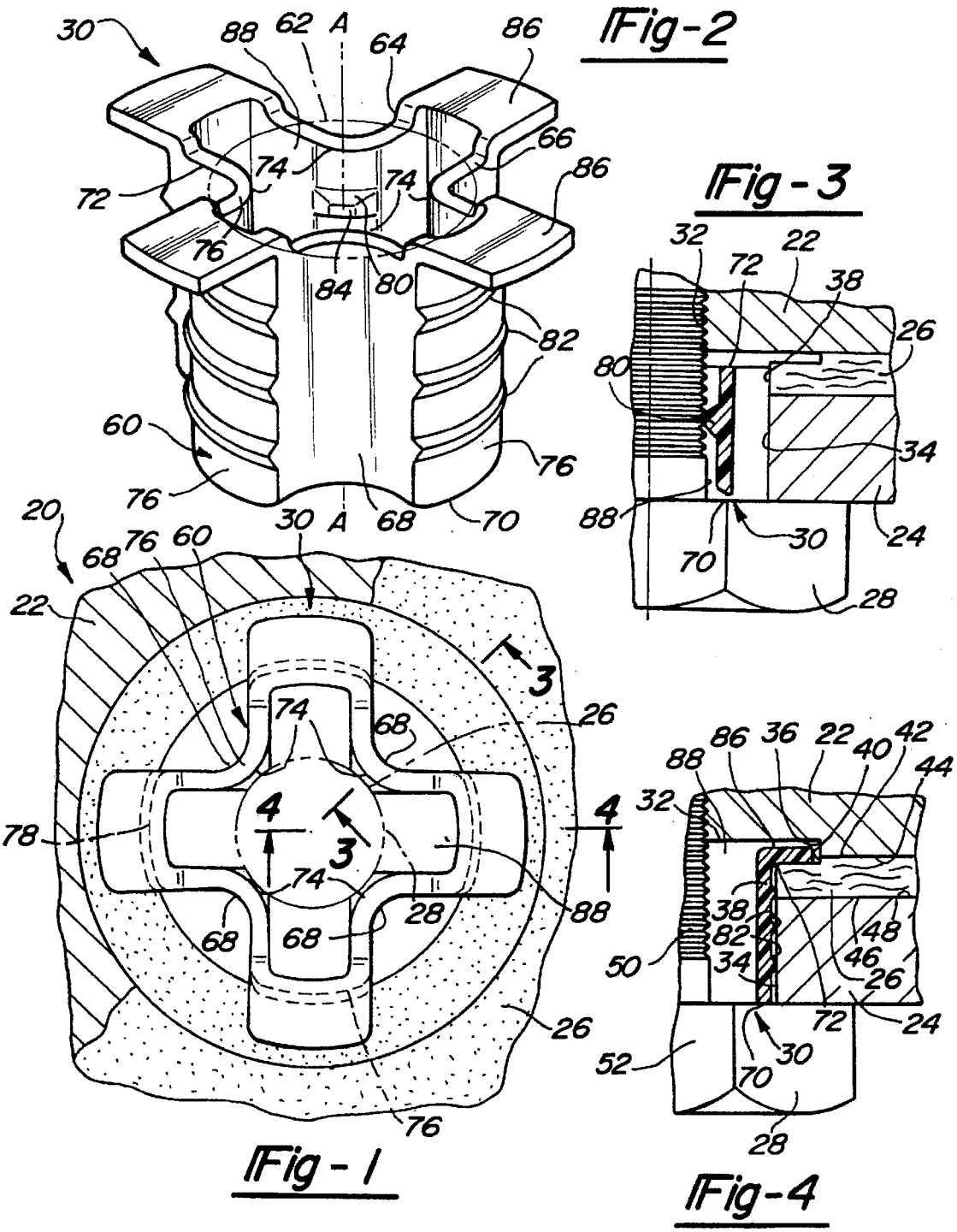

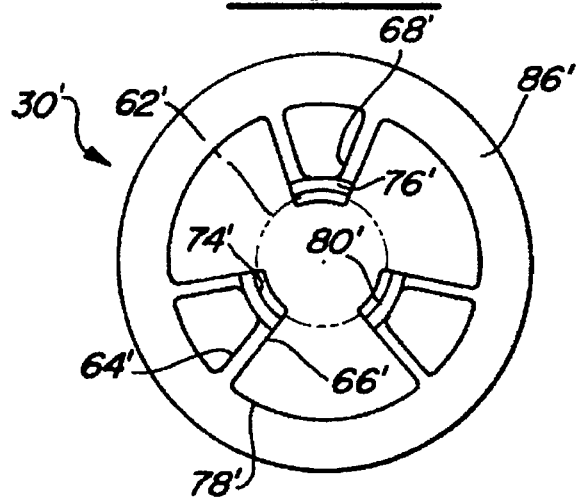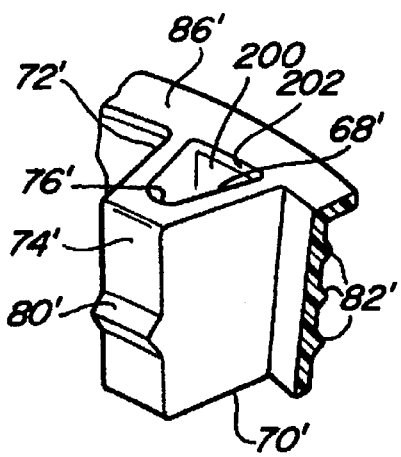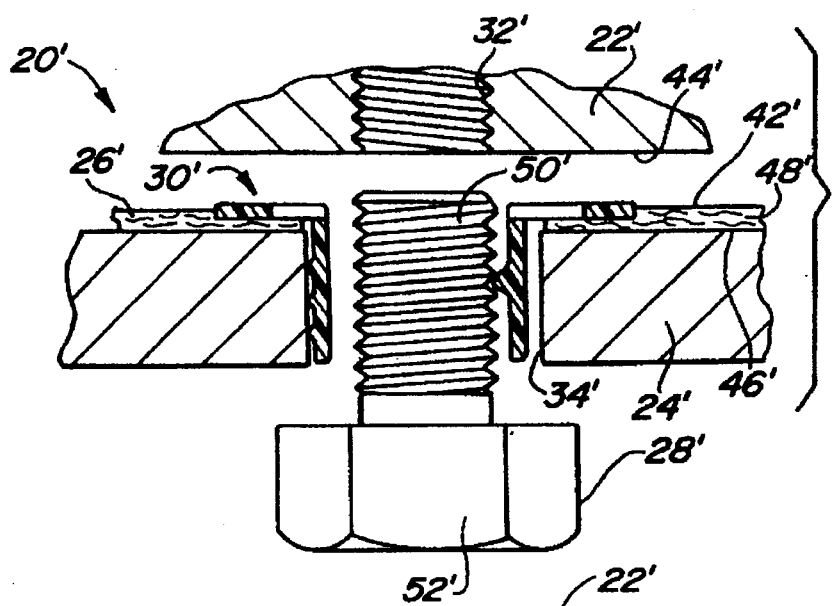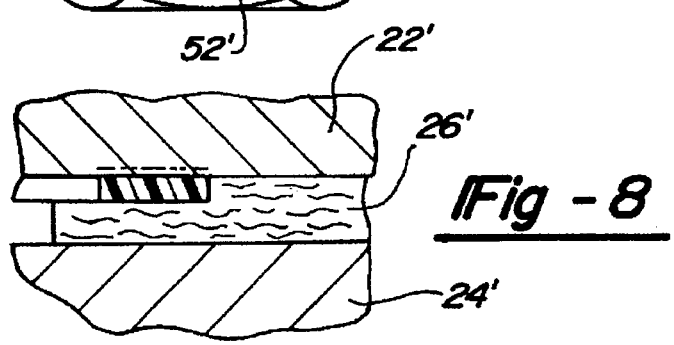

MULTI-PURPOSE GROMMET

FIELD OF THE INVENTION

The present invention relates to a flexible grommet. More particularly, the invention is directed to a grommet adapted to be received in an aperture of an internal combustion engine gasket with the multiple purposes of frictionally engaging the gasket to prevent separation, locating the gasket with respect to mechanical components, and retaining a threaded fastener in the grommet which is used to mate the mechanical components.

BACKGROUND OF THE INVENTION

Positioning devices are known for locating a gasket between two separate but communicating or mating components of an internal combustion engine. The communicating components contain mating bores for the passage of mechanical fasteners. The gasket is adapted to provide sealing between the engine components when they are joined. The positioning devices, also known as grommets, bushings, eyelets, and ferrules, are utilized to help in the accurate placement of the gasket on one of the components to be joined, typically through an interference fit between the device and a bore of the component receiving the device. Positioning devices have included plastic members having tapered bodies for positive placement.

Most positioning devices are separate from the gasket, requiring that they be inserted in an aperture of the gasket after the gasket has been laid over the surface of one of the communicating components. Typically, such positioning devices are not positively retained within the gasket aperture, allowing undesirable separation of the device from the gasket before final assembly. It is known to mold a positioning device in the gasket. However, the positioning device molded in the gasket has less gasket material available to seal between the mating engine components, leading to increased gasket leakage. There are also increased assembly costs associated with molding a positioning device in a gasket.

Plastic positioning devices are known which receive fasteners used to join the mating mechanical components. However, the fasteners are not retained within such positioning devices to prevent unwanted separation of the fasteners from the gasket before final assembly. Instead, separate fastener retention devices are used to retain the fasteners. Typically, a fastener retention device comprises a sleeve with mating threads that threadingly engage a threaded fastener, or protrusions that extend radially inwardly from an inner wall of the sleeve to engage the fastener.

SUMMARY OF THE INVENTION

A single piece flexible plastic grommet is disclosed which is adapted to be received in an aperture of an internal combustion engine gasket disposed between separate but communicating mechanical components with mating bores. Typically, the mechanical components are an engine block and an engine cover. The grommet frictionally engages the gasket aperture to prevent separation of the grommet from the gasket and also frictionally retains a threaded fastener used to join the block to the cover. Thus, the grommet may be used to retain the gasket and fastener together as a subassembly to keep the discrete components from separating in transit or from handling before the cover is joined to the block. The grommet also locates the gasket with respect to the engine cover to promote proper sealing of the mechanical components by the gasket.

The grommet includes a sidewall comprising at least three symmetrically spaced circumferentially disposed grooves extending longitudinally from a first longitudinal grommet end to a second longitudinal grommet end. An innermost periphery of the sidewall is defined by a base of each groove with an outermost periphery of the sidewall extending circumferentially between each of the grooves. The outermost periphery of the sidewall comprises a plurality of locking projections extending radially outwardly which promotes the frictional engagement of the grommet with the gasket aperture and mating bore of the engine cover, aligning the aperture of the gasket with the mating bore to correctly position the gasket. The innermost periphery of the sidewall comprises a plurality of locking projections extending radially inwardly which promote frictional retention of the fastener within the grommet. Finally, the grommet has at least one radially outwardly extending flange secured to the outermost periphery of the grommet at one of the longitudinal ends of the grommet, the flange placed in contact with the gasket and the engine block. In one embodiment there is a single continuous flange circumferentially disposed about the grommet while in an alternative embodiment there are a plurality of flanges symmetrically spaced and circumferentially disposed about the grommet. Depending on the thickness and compressibility of the gasket and the minimum thickness permissible for the grommet flanges, the gasket and engine block may each include a counterbore to receive the grommet flanges.

The unique configuration of the flexible grommet means that it undulates about a radial line to define symmetrically spaced and circumferentially disposed radially outer interference sections and radially inner interference sections which allow springlike radial deformation of the grommet. Such flexibility is required for the grommet to simultaneously frictionally engage the fastener and also be frictionally engaged within the gasket aperture and mating bore of the engine cover. The number of flanges or interference sections, the sidewall thickness, and construction of the locking projections may be customized for a particular application, providing a device with significant advantages over the prior art.

BRIEF DESCRIPTION OF THE DRAWINGS

The features and inventive aspects of the present invention will become more apparent upon reading the following detailed description, claims, and drawings, of which the following is a brief description:

FIG. 1 is an end view with a fragmentary cross-section of a first embodiment of the present invention showing a grommet positioned within an aperture of a gasket and retaining a fastener, wherein the gasket is disposed between mating mechanical components.

FIG. 2 is a perspective view of the grommet.

FIG. 3 is a cross-sectional view taken along lines 3—3 of FIG. 1.

FIG. 4 is a cross-sectional view taken along lines 4—4 of FIG. 1.

FIG. 5 is an end view of a second embodiment of a grommet according to the present invention.

FIG. 6 is a fragmentary perspective view of the grommet of FIG. 5.

FIG. 7 is a cross-sectional view of the grommet of FIG. 5 positioned within an aperture of a gasket and retaining a bolt, wherein the gasket is disposed between mating mechanical components.

FIG. 8 is a fragmentary cross-sectional view showing gasket compression in response to grommet flange placement.

DETAILED DESCRIPTION OF A PREFERRED EMBODIMENT

A gasket assembly 20 for an internal combustion engine is illustrated in FIGS. 1 through 4. Assembly 20 includes two separate, but communicating mechanical components 22 and 24, a gasket 26 disposed therebetween, a fastener 28 for joining components 22 and 24, and a flexible annular grommet 30.

Mechanical components 22 and 24 typically correspond to an engine block and engine cover, respectively. As illustrated in FIGS. 3 and 4, block 22 and cover 24 have mating bores 32 and 34 sharing a common longitudinal axis. Bore 32 is threaded and includes at least a partial counterbore 36 at selected circumferential locations about its periphery. Bore 34 has a greater diameter than bore 32 and is not threaded.

Gasket 26 corresponds to a typical gasket known to those skilled in the art. Gasket 26 includes an aperture 38 that aligns with bores 32 and 34 in a final assembled position. As illustrated in FIGS. 3 and 4, the diameter of aperture 38 corresponds to the diameter of bore 34. Gasket 26 also includes a continuous annular counterbore 40 that has a diameter corresponding to that of counterbore 36, as best illustrated in FIG. 4. An upper face 42 of gasket 26 contacts a corresponding face 44 of block 22 while a lower face 46 of gasket 26 contacts a corresponding face 48 of cover 24. Fastener 28 includes a threaded shaft 50 that threadingly engages bore 32 and a head 52 that engages face 54 of cover 24.

As illustrated in FIG. 2, grommet 30 is a single flexible plastic unit component extending co-axially with longitudinal axis A—A. Grommet 30 is preferably made from a nylon and more preferably from a 6.6 type nylon with temperature resistance and flexibility. Grommet 30 includes a longitudinally extending sidewall 60 of generally constant wall thickness undulating about a radial line 62 to define at least three symmetrically spaced and circumferentially disposed radially outer interference sections 64 and radially inner interference sections 66, respectively. Four such outer and inner interference sections 64 and 66 are illustrated in FIGS. 1 and 2. Outer interference sections 64 extend radially outwardly of line 62 while inner interference sections 62 extend radially inwardly of line 62.

Sidewall 60 of grommet 30 includes a plurality of symmetrically spaced circumferentially disposed generally U-shaped grooves 68 extending longitudinally from a first longitudinal end 70 to a second longitudinal end 72 and radially inwardly. An innermost periphery 74 of inner interference section 66 of sidewall 60 is defined by a base 76 of each groove 68 while an outermost periphery 78 of outer interference section 64 extends circumferentially between grooves 68. Outermost periphery 78 has a greater circumferential extent than innermost periphery 74. Therefore, there is greater surface area of contact available for outermost periphery 78 when compared with innermost periphery 74. Innermost periphery 74 and outermost periphery 78 include a plurality of locking projections 80 and 82, respectively. Innermost periphery 74 of each base 76 has a single locking projection 80 which is generally prism shaped with a rounded inner radial point 84. Outermost periphery 78 has three locking projections 82 equally longitudinally spaced between ends 70 and 72. Each projection 80 extends a full circumferential extent between adjacent grooves 68 and radially outwardly from sidewall 60.

Grommet 30 also has a plurality of radially outwardly extending flanges 86. Each flange 86 is secured to the outermost periphery 78 of each interference section 64 at longitudinal end 72.

The unique configuration of flexible grommet 30 allows the formation of a unitized multi-component subassembly comprising the grommet, gasket 26 and fastener 28. The construction of grommet 30, with outer and inner interference sections 64 and 66 formed by grooves 68, allows springlike radial deformation of the grommet. In an undeformed shape, inner radial point 84 has a smaller diameter than the outer diameter of shaft 50. When fastener 28 is inserted into an opening 88 defined by sidewall 60, sidewall 60 flexes as required to create an interference fit between locking projections 80 and fastener shaft 50 such that fastener 28 will not separate from grommet 30. Similarly, in an undeformed shape, locking projections 82 have a greater diameter than a corresponding diameter of gasket aperture 38. When grommet 30 is inserted through aperture 38, sidewall 60 again flexes as required to create an interference fit between the grommet and aperture 38. When grommet 30 is inserted through aperture 38, gasket 26 is retained between flanges 86 and locking projections 82 such that grommet 30 will not separate from gasket 26. Thus, a single retaining device may be used to retain fastener 28 and gasket 26 together to keep the discrete components from separating in transit or from handling before cover 24 is joined to block 22. Thus, final assembly is simplified, reducing time and saving cost.

Grommet 30 also locates gasket 26 in assembly 20. As best illustrated in FIG. 4, projections 82 help to locate the grommet with respect to bore 34 of cover 24. In turn, the relationship between projections 82 and gasket aperture 38 aligns the aperture with bore 34 to correctly locate the gasket as required to ensure proper sealing.

Depending on the thickness and compressibility of gasket 26 and the minimum thickness permissible for flanges 86, gasket 26 may be coined to create counterbore 42 such that flange 86 is imbedded into the gasket upon final assembly. Sealing contact is created between gasket faces 42 and 46 and corresponding component faces 44 and 46. Counterbore 36 of engine block 22 may also be required to prevent undue minimization of either gasket or flange thickness while maintaining the sealability performance of gasket 26.

A second embodiment of the present invention is illustrated in FIGS. 5 through 8, wherein the same elements have the same reference numbers as in the embodiment of FIGS. 1 through 4. Assembly 20' is similar to assembly 20, but has a different grommet 30', gasket 26', and engine block 22'. Gasket 26' is soft, meaning that it is readily compressed. Therefore, counterbores are not required in either engine block 22' or in gasket 26'. Instead, as shown in FIG. 8, when block 22' is joined to cover 24', gasket 26' compresses to compensate for the thickness of flange 86' without detracting from the sealability performance of the gasket. Thus, manufacturing expense is reduced.

As illustrated in FIGS. 5 and 6, the structure of grommet 30' is designed to take advantage of soft gasket 26'. Grommet 30' has a continuous single circumferentially disposed flange 86' secured to the outermost periphery 78 of each interference section 64' at longitudinal end 72'. Thus, an opening 200 is defined by an inner radial periphery 202 of flange 86' and each of grooves 68'. A single flange 86' provides a strength advantage to grommet 30' when compared to multiple flanges, but the ability to be embedded in a gasket 26' may be impaired because of the additional surface area between the flange and gasket. Thus, a single flange 86' is not recommended when a hard gasket having little compressibility is required.

Grommet 30' also has a sidewall of non-constant wall thickness with only three symmetrically spaced and circumferentially disposed radially outer interference sections 64' and radially inner interference sections 66', defined with respect to radial centerline 62'. Reducing the number of interference sections 64' and 66' typically reduces the ability of grommet 30' to radially flex. Additional radial stiffness is provided by providing base 76' with greater radial thickness, and innermost periphery 74' with a greater circumferential extent when compared with grommet 30. Further, stiffness, and the ability to retain fastener 28' is increased when radially inwardly extending locking projections 80' are not prism shaped, but instead have a longitudinal extent corresponding to that of innermost periphery 74.

Preferred embodiments of the present invention have been disclosed. A person of ordinary skill in the art would realize, however, that certain modifications would come within the teachings of this invention. For example, if the gasket were made from the same material as the inventive grommet, the grommet may be formed with the gasket as a part of a common molding process. Thus, at least a portion of the grommet, such as the grommet flanges, could be integrated with the gasket. Therefore, the following claims should be studied to determine the true scope and content of the invention.

What is claimed is:

1. A flexible annular grommet extending along a longitudinal axis that is adapted to radially deform and frictionally engage a bore of one of two separate but communicating mechanical components of an internal combustion engine, locate a gasket with respect to the mechanical components, and retain a threaded fastener prior to final assembly of the mechanical components, said grommet comprising:

a continuous sidewall comprising a plurality of symmetrically spaced circumferentially disposed grooves extending longitudinally from a first longitudinal end of said grommet to a second longitudinal end of said grommet, each said groove extending radially inwardly, an innermost periphery of said sidewall defined by a base of each of said grooves and adapted to frictionally engage the fastener, an outermost periphery of said sidewall extending circumferentially between said each of said grooves and adapted to frictionally engage the gasket and one of the mechanical components, wherein said innermost periphery and said outermost periphery of said sidewall comprise a plurality of locking projections extending radially away from said sidewall to promote frictional engagement between said grommet and the gasket, fastener, and the one of the mechanical components; and at least one radially outwardly extending flange secured to said outermost periphery of said grommet at one of said longitudinal ends of said grommet and adapted to be disposed between said gasket and the other one of the mechanical components.

2. A grommet as recited in claim 1, wherein said grommet is formed from nylon.

3. A grommet as recited in claim 1, wherein said sidewall is of generally constant wall thickness.

4. A grommet as recited in claim 1, wherein said outermost periphery has a plurality of said locking projections longitudinally spaced from said first end to said second end.

5. A grommet as recited in claim 4, wherein each of said projections has a full circumferential extent between each of said grooves.

6. A grommet as recited in claim 1, wherein said innermost periphery only has a single locking projection per each said base.

7. A grommet as recited in claim 2, wherein said innermost periphery has a smaller circumferential extent than said outermost periphery.

8. A grommet as recited in claim 2, wherein there are a plurality of said flanges symmetrically spaced and circumferentially disposed about said grommet.

9. A grommet as recited in claim 2, wherein a single continuous flange is circumferentially disposed about said grommet with openings defined by an inner radial periphery of said flange and each of said grooves.

10. A grommet as recited in claim 2, wherein there are at least three of said grooves symmetrically spaced and circumferentially disposed about said grommet.

11. A flexible annular grommet extending along a longitudinal axis that is adapted to radially deform and frictionally engage a bore of one of two separate but communicating mechanical components of an internal combustion engine, locate a gasket with respect to the mechanical components, and retain a threaded fastener prior to final assembly of the mechanical components, said grommet comprising:

a continuous longitudinally extending sidewall undulating about a radial line to define at least three symmetrically spaced and circumferentially disposed radially outer interference sections and radially inner interference sections wherein said outer interference sections extend radially outwardly from said radial line and are adapted to frictionally engage the gasket and one of the mechanical components while said inner interference sections extend radially inwardly from said radial line and are adapted to frictionally engage the fastener, wherein an outermost periphery of said outer interference sections and an innermost periphery of said inner interference sections comprises a plurality of locking projections extending radially away from said sidewall to promote frictional engagement between said grommet and the gasket, fastener, and the one of the mechanical components; and at least one radially outwardly extending flange secured to said outermost periphery of said grommet at a longitudinal end of said grommet and adapted to be disposed between said gasket and the other one of the mechanical components.

12. A gasket sub-assembly for an internal combustion engine adapted to join and seal two separate but communicating mechanical components with mating bores, comprising:

a gasket adapted to be disposed between and providing sealing for said mechanical components, said gasket having an aperture adapted to be aligned with the mating bores of said mechanical components;

a threaded fastener adapted to join the mechanical components together; and an annular grommet extending along a longitudinal axis that is adapted to align said aperture with the mating bores of the mechanical components, said grommet including a continuous sidewall comprising at least three symmetrically spaced circumferentially disposed grooves extending longitudinally from a first longitudinal end of said grommet to a second longitudinal end of said grommet, each said groove extending radially inwardly, an innermost periphery of said sidewall defined by a base of each of said grooves, an outermost periphery of said sidewall extending circumferentially between said each of said grooves, wherein said outermost periphery of said sidewall comprises a plurality of locking projections extending radially outwardly such that said grommet frictionally engages a wall of said aperture to prevent separation of said grommet from said gasket, said innermost periphery of said sidewall comprising a plurality of locking projections extending radially inwardly to frictionally engage said fastener to prevent separation of said fastener from said grommet; and at least one radially outwardly extending flange secured to said outermost periphery of said grommet at one of said longitudinal ends of said grommet, said flange in selective contact with said gasket.

13. A gasket sub-assembly as recited in claim 12, wherein said gasket includes a counterbore adjacent said aperture, said flange of said grommet received within said counterbore.

14. A gasket assembly for an internal combustion engine, comprising:

two separate but communicating mechanical components with mating bores, a gasket disposed between and providing sealing for said mechanical components, said gasket having an aperture aligned with said mating bores of said mechanical components;

a threaded fastener received in said mating bores and joining said mechanical components together; and an annular plastic grommet extending along a longitudinal axis, said grommet including a continuous sidewall comprising at least three symmetrically spaced circumferentially disposed grooves extending longitudinally from a first longitudinal grommet end to a second longitudinal grommet end, each said groove extending radially inwardly, an innermost periphery of said sidewall defined by a base of each of said grooves, an outermost periphery of said sidewall extending circumferentially between said each of said grooves, wherein said outermost periphery of said sidewall comprises a plurality of locking projections extending radially outwardly such that said grommet frictionally engages a wall of said aperture to prevent separation of said grommet from said gasket and frictionally engages one of said mating bores to align said aperture of said gasket with said mating bores to correctly position said gasket, said innermost periphery of said sidewall comprising a plurality of locking projections extending radially inwardly to frictionally engage said fastener; and at least one radially outwardly extending flange secured to said outermost periphery of said grommet at one of said longitudinal ends of said grommet, said flange in contact with said gasket and one of said mechanical components.

15. A gasket assembly as recited in claim 14, wherein said gasket includes a counterbore adjacent said aperture, said flange of said grommet received within said counterbore.

16. A gasket assembly as recited in claim 14, wherein said bore of said one of said mechanical components includes a counterbore, said flange of said grommet received within said counterbore.

17. A gasket assembly as recited in claim 14, wherein a single continuous flange is circumferentially disposed about said grommet with openings defined by an inner radial periphery of said flange and each of said grooves.

18. A gasket assembly as recited in claim 14, wherein there are a plurality of said flanges symmetrically spaced and circumferentially disposed about said grommet.

* * * * *